May 22, 1962
C. P. POROWSKI
3,035,411
THRUST REVERSER ACTUATING MECHANISM
Filed Feb. 26, 1960
2 Sheets-Sheet 1
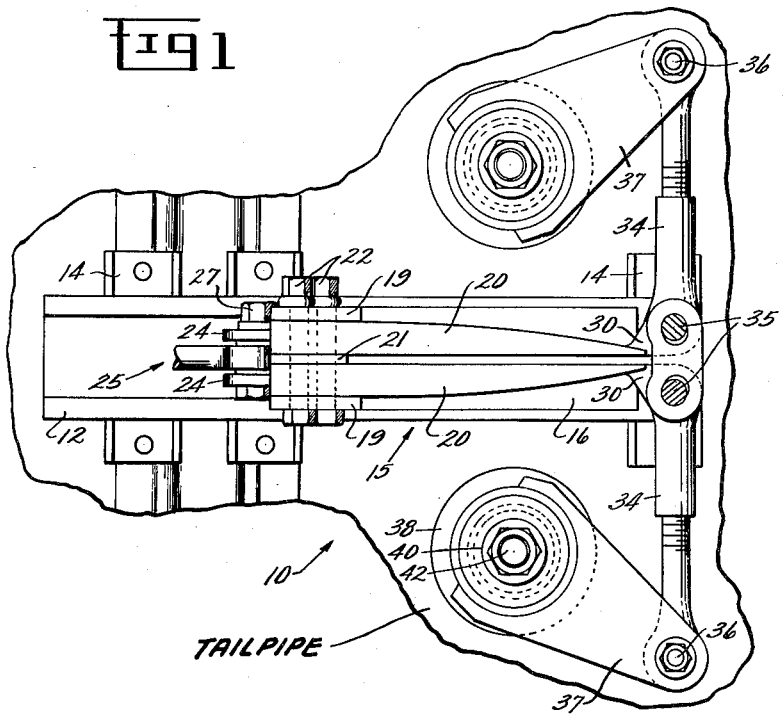
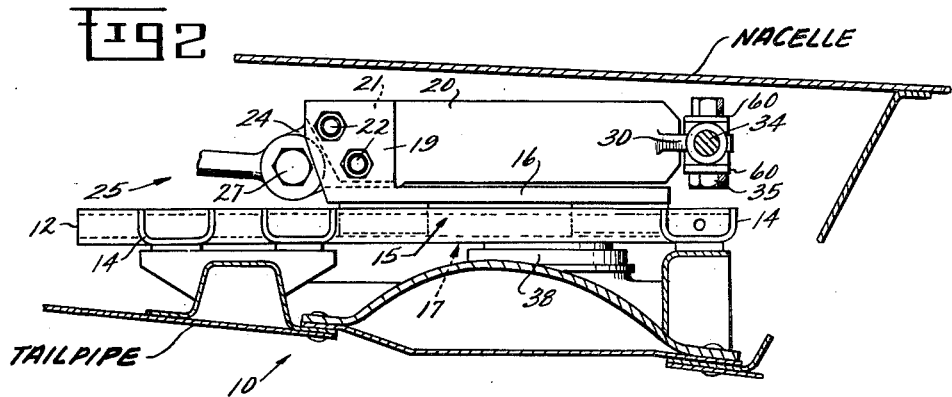
INVENTOR.
CASIMER P. POROWSKI
BY
Harry C. Burgess
ATTORNEY May 22, 1962 C. P. POROWSKI 3,035,411
THRUST REVERSER ACTUATING MECHANISM
Filed Feb. 26, 1960 2 Sheets-Sheet 2
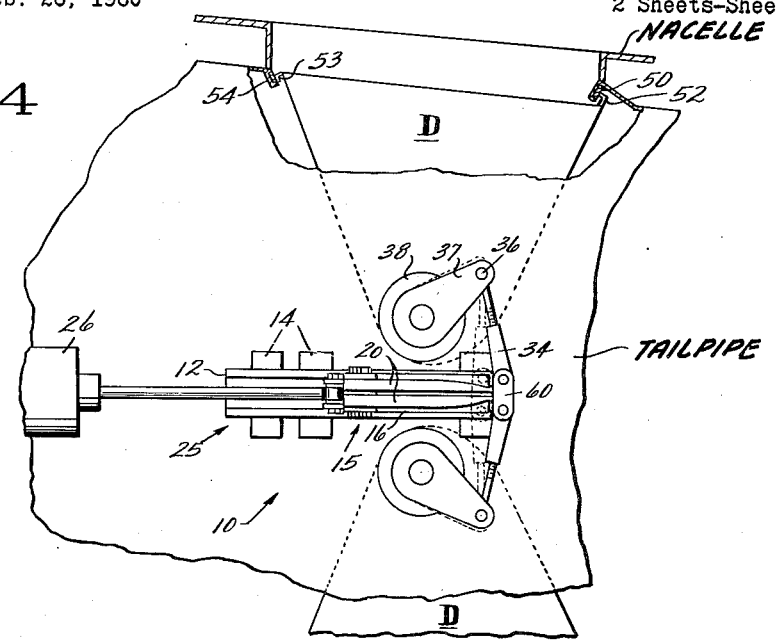
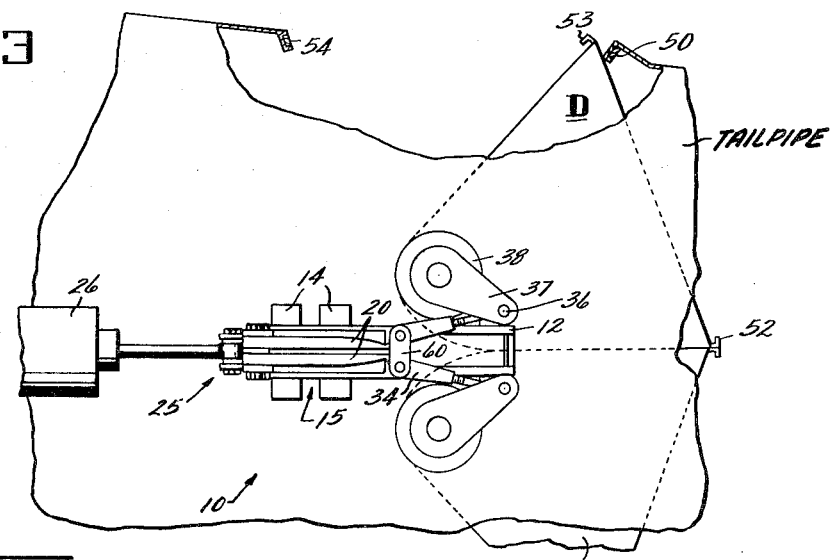
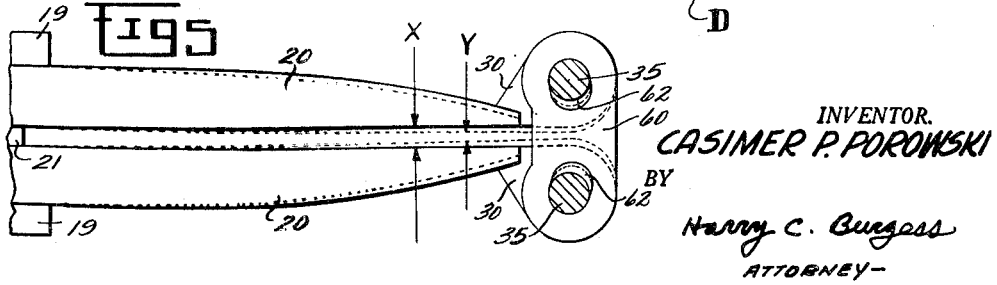
INVENTOR.
CASIMER P. POROWSKI
BY
Harry C. Burgess
ATTORNEY United States Patent Office 3,035,411
Patented May 22, 1962

3,035,411
THRUST REVERSER ACTUATING MECHANISM
Casimer P. Porowski, Cincinnati, Ohio, assignor to General Electric Company, a corporation of New York
Filed Feb. 26, 1960, Ser. No. 11,232
6 Claims. (Cl. 60—35.54)

The present invention relates to a thrust reverser for an aircraft propulsion plant and, more particularly, to a jet engine thrust reverser having an improved actuating mechanism.

A variety of devices have been proposed for deviating the direction of the jet of an aircraft jet engine to a generally forward direction, so that a thrust component is available for deceleration of the aircraft. One of the more general types of such devices, is that which mechanically blocks the engine exhaust duct or tailpipe to deflect the exhaust gases and spoil or reverse the thrust. One means of mechanically blocking the exhaust gas that has found wide usage consists of a pair of symmetrical baffles or blocker doors, pivotally mounted within the engine tailpipe and arranged to come into abutment in the center of the exhaust gas stream to cause it to deflect in the manner stated above.

When the baffles are in the nonoperative, or stowed position, as during the normal forward thrust mode of operation of the engine, it is necessary to insure that the baffles do not suddenly or accidentally become uncontrollable and possibly interfere with the forward thrust of the engine for obvious reasons of safety. Therefore, one of the problems facing designers of thrust reversers is to provide the necessary margin to safety in the actuating mechanism which moves the baffles to and from their nonoperative positions. Preferably such a fail-safe mechanism should be light, compact, and as simple as possible mechanically, since it is being utilized in an airborne vehicle, yet strong enough to provide reliable means for securely locking the baffles in the desired position.

Another desirable design feature in a thrust reverser such as the one described above is some means whereby the baffles are always caused to travel through the same path and at the same relative velocity during operation. The actuating mechanism linkage should accurately synchronize the position of the baffles at all points in their travel from a stowed to an operating position, and return, to prevent any appreciable transverse gas force becoming imposed on the engine housing or tailpipe because of dissimilarities in the gas streams emerging from either side of the baffles.

Utilization of a thrust reverser of the above-described type also requires that sealing means be provided between the baffles when they are in abutment, and between the tailpipe and baffles when the latter are in the nonoperative position. When the sealing means is of the normally pressure-loaded variety, i.e., compressed by the gases passing through the tailpipe, it is essential to insure that the sealing means is always compressed sufficiently to prevent gas leakage so as to insure a maximum thrust component in the desired mode and to increase the life of the seals by eliminating the cutting action of hot gases flowing by the seals.

Accordingly, it is an object of the present invention to provide an actuating mechanism for a jet engine thrust reverser having a plurality of movable baffles which is fail-safe in the nonoperative, or forward thrust position in the event of failure of the means supplying power to the mechanism.

A further object of the present invention is to provide an actuating mechanism for a jet engine thrust reverser having a plurality of movable baffles including linkage means to lock the baffles in a nonoperative position which means is compact, light, and contains a minimum number of parts.

A further object of this invention is to provide a jet engine thrust reverser having a plurality of movable baffles actuated by a fail-safe mechanism including linkage means synchronizing the position of the thrust reverser baffles as the baffles travel to and from their nonoperative, or stowed, positions.

A further object of this invention is to provide a jet engine thrust reverser having a plurality of movable baffles actuated by a fail-safe mechanism including means which will bias the baffles against sealing means provided on an exhaust duct of the engine to reduce gas leakage and to increase the endurance life of the sealing means.

Briefly, an embodiment of my improved actuating mechanism for use with a jet engine thrust reverser having a plurality of movable baffles for blocking gases issuing from the engine exhaust duct comprises: guide means mounted on the exhaust duct; a plurality of supporting members slidably engaged with the guide means; actuator means operatively connected to the supporting members; and linkage means including biasing means carried by the supporting members, the linkage means being adapted to lock the baffles in the nonoperative position to prevent unwanted loss of forward thrust by a sudden or accidental movement of the baffles from the nonoperative position to the reverse thrust position.

Other objects and advantages of this invention will be readily appreciated and more clearly understood by reference to the following description when considered in connection with the accompanying drawings wherein:

FIG. 1 is a plan view of one-half of an embodiment of my improved thrust reverser actuating mechanism; and FIG. 2 is a side elevation, partially in cross-section, of the embodiment of FIG. 1; and FIG. 3 is a plan view of a portion of a jet engine tailpipe illustrating the thrust reverser actuating mechanism and the movable baffles, the baffles and the mechanism being in the reverse thrust position; and FIG. 4 is a plan view of the apparatus in FIG. 3 illustrating the baffles in the nonoperative or forward thrust position; and FIG. 5 is an enlarged plan view of an embodiment of the biasing means for preloading the normally pressure-loaded thrust reverser seals, and including a safety device for use with the mechanism.

Referring now more particularly to the drawings, FIGS. 1 and 2 illustrate the top half of an embodiment of my actuating mechanism for use with a thrust reverser of the type shown in FIGS. 3 and 4, i.e., wherein the baffles are arranged to pivot within the jet engine tailpipe. It will be understood, however, that this is merely illustrative and that the invention is capable of use with other types of thrust reversers, e.g., the so-called "target-type." Since both halves of the mechanism are identical, only one will be discussed.

The actuating mechanism is mounted on a jet engine tailpipe or exhaust duct indicated generally at 10. The mechanism includes guide means in the form of a track 12 axially aligned with respect to the tailpipe and mounted thereon by any suitable means, such as supporting beams 14. Supported on the track and adapted for slidable movement with respect thereto is a supporting member indicated generally at 15. The supporting member includes an elongated flat base portion 16 from which depends a bottom portion indicated at 17. The bottom portion is adapted to engage the track so as to guide the member as it slides axially back and forth on the track during actuation of the thrust reverser baffles, as described below. The forward end of the base portion 16 of the supporting member includes a pair of generally rectangular flanges 19 extending at right angles to the upper surface of the base portion and in a spaced, parallel relationship to each other so as to form a yoke. To insure preloading of the thrust reverser sealing means my improved actuating mechanism includes biasing means. In the instant embodiment the biasing means comprises a pair of elongated, flat, and generally rectangular resilient members or bars 20. One end of each bar is received in the supporting member yoke, the ends of the bars being separated by means of a flat spacer 21 which acts as a fulcrum to facilitate deflection of the bars. Aligned holes are provided in the yoke flanges 19, the aforementioned ends of the resilient members, and the spacer 21, whereby the members are rigidly secured to the supporting member 15 by suitable fastening means, such as bolts 22. Attached to or formed integrally with the secured ends of the resilient members are vertical ears 24 spaced to form a clevis for receiving the end of an actuator rod indicated at 25. In the instant embodiment, power is supplied to the mechanism by a piston 26, as shown in FIGS. 3 and 4. However, any suitable electrical or hydraulic power supplying device would serve equally as well. The actuator rod end is pivotally secured in the clevis by a bolt 27 adapted to pass through aligned holes provided in the clevis ears and the rod end. The other end of each of the bars 20 includes a horizontal holed flange 30 arranged to operatively connect the bars to the rest of my improved actuating mechanism linkage. Obviously, the resilient biasing means herein described could consist of other suitable devices capable of deflection, such as, for example, an integral bifurcated bar having a pair of slightly resilient arms sufficiently separated so as to function as do the two bars shown in the instant embodiment.

The linkage for translating movement of the actuator rod to the baffles comprises a pair of connecting links 34, which may be made adjustable, as shown, pivotally attached to the resilient members 20 by means of pivot pins 35. The connecting links are, in turn, pivotally connected at 36 to lever arms 37 rigidly attached to the baffles. To allow the baffles to pivot into the gas stream the tailpipe is provided with bearing plates 38 which support trunnions 40 adapted to receive bolts 42, rigidly connected to the lever arms 37, for movement therein.

In FIG. 3, two identical baffles "D" are shown in the reverse thrust position. With the doors in this position operation of the actuating mechanism is as follows: On energization of the hydraulic, or electric actuator means 26, the supporting member 15, now at its forwardmost position along the track 12, starts to move rearwardly. As the member slides along the track, the baffles start to pivot about the trunnions 40 to the forward thrust position since the motion of the supporting member is impressed on the bars 20 carried thereon, which, in turn, through the connecting links 34, move the baffle lever arms 37. As the connecting links approach an in-line or perpendicular position, i.e., a position approximately normal to the axis of the track as shown in the dotted lines of FIG. 4, the mechanical arrangement of the linkage and the biasing means is such that the tailpipe sealing means 50 and 54 will be preloaded or compressed by the seal surfaces 52 and 53 on the baffles, the bars 20 being deflected towards each other an amount previously determined by the length, or adjustment of the connecting links. Preloading of the normally pressure-loaded sealing means accomplished by the just described cantilever-like spring action of the actuating mechanism, will reduce chances of gas leakage as a result of warpage, mis-alignment or other defects in the mechanism preventing the sealing means from beig positively loaded by the gas pressure. In addition, preloading insures greater endurance life of the sealing means since the cutting action which accompanies hot gas leakage is greatly reduced or completely eliminated.

By referring now specifically to FIG. 4, the fail-safe feature of the mechanism will become more apparent in that it can be seen that when the connecting links have moved past the center, or in-line position, they will assume a toggled or cocked position. This action latches or locks the baffles in the forward thrust or nonoperative position. In this position a positive movement of the actuator means and supporting member is necessary before the baffles will be able to move from forward thrust to reverse thrust. Therefore, the baffles can be said to be fail-safe in the nonoperative position in the event of accidental actuator failure, for example, by loss of hydraulic pressure or electrical power, or because the actuator rod fails.

Another safety feature incorporated in the invention is the provision for a retaining strap 60 attached across the rearmost ends of the bars 20 at the top and bottom thereof. Each strap acts as a safety device in the event one of the bars 20 should fail. In such event the lever arm and connecting link of the affected baffle will be controlled by the bar and link of the other baffle being operatively connected to the former by means of the strap. This will insure against the danger of uncontrolled movement whereby a loose baffle might pivot into the gas stream and retard forward thrust. In addition, the strap acts as a stop which prevents the bars 20 from spreading out too far when the actuator means pulls the supporting member back into the reverse thrust position, as shown in FIG. 3. By referring specifically to FIG. 5, it will be seen that the straps include a pair of elongated apertures 62 which provide freedom of movement for the pivot pins 35 received therein. This is necessary by reason of the deflection of the biasing means. The line "X," in FIG. 5, shows the position of the bars when the connecting links are in the toggled or off-center position and line "Y" shows the slightly greater deflection when the links are in the perpendicular or in-line position. In both instances the linkage is so constructed, however, to insure that the preloading action, described above, occurs.

It will be obvious from the above description that my improved thrust reverser actuating mechanism effectively synchronizes the position of the baffles since the various parts of the linkage are symmetrical and any difference in position of the baffles in either the reverse or forward thrust position can be corrected by adjusting the connecting links. This accurate synchronization of the baffle positions prevents any appreciable transverse gas force from being imposed on the engine tailpipe or housing because of a dissimilarity in the gas stream emerging from either side of the thrust reverser baffles.

It is also desirable that such a mechanism provide almost instantaneous movement of the baffles into the reverse thrust mode of operation. The kinematics of the above-described mechnaism makes possible not only a very short time interval to change from forward to reverse thrust, but also provides a relatively slow approach velocity of the baffles as they come into abutment with the sealing means when going from reverse to forward thrust position. In other words, although the initial stroke of the actuating rod is designed to move the sliding supporting member relatively fast, as the linkage approaches the cocked or toggled position, the deflection of the resilient members, in cooperation with the connecting links, automatically slows down the movement of the baffles so that, in effect, they are not projected violently into the sealing means.

Finally, in addition to being composed of a few simple and reliable mechanical elements, my improved actuating mechanism is capable of fitting into a very small space, for example, between the engine tailpipe and the outer engine nacelle or housing, as shown in FIGS. 2 and 4. This is desirable since it adds to engine performance by insuring that the baffle mechanism is stowed out of the air stream to present an aerodynamically clean aircraft.

Obviously, modifications and variations of the present invention are possible in the light of the above teachings. Therefore, it will be understood that within the scope of the appending claims, the invention may be practiced otherwise than as specifically described.

I claim:
1. Actuating mechanism for a jet powerplant thrust reverser having a plurality of circumferentially distributed movable baffles disposed to deflect the gas stream issuing from the powerplant exhaust duct and movable to a non-operative position forming a part of the powerplant structure, sealing means between said baffles and adjacent powerplant structure, at least one axially aligned guide means supported adjacent the outer surface of said duct, said guide means being located between adjacent baffles; a supporting member slidably engaged with said guide means; power supplying means operably connected to said supporting member to cause said member to move with respect to said guide means; and linkage means operatively connected between the supporting member and said adjacent baffles for translating the movement of said supporting member to the baffles, said linkage means including a pair of axially aligned, spaced resilient bars rigidly attached at one end to the supporting member, a connecting link attached to the other end of each bar to pivotally connect said bars to the baffles, the bars being arranged to deflect towards each other to load said sealing means as the supporting member moves on said guide means a predetermined distance whereby said connecting links assume an overcenter position to lock said linkage and said baffles in a nonoperative position.

2. The actuating mechanism as described in claim 6 wherein said other bar ends are joined by a restraining strap adapted to act as a stop when said mechanism is in the reverse thrust position, said strap being constructed and arranged to cooperate with each of said bars to operatively connect both of said adjacent baffles to the actuating means in the event of failure of one or the other of said bars.

3. An improved actuating mechanism for a jet engine thrust reverser having a pair of movable baffles which are movable between a non-operative position and an operative position wherein the baffles are adapted to deflect rearwardly directed engine exhaust gases issuing from a duct attached to said engine and having normally loaded sealing means between the baffles and duct, said mechanism comprising: a pair of axially aligned guide means circumferentially spaced about the outer surface of said duct; a supporting member slidably engaged for relative axial movement with each of said guide means; power supplying means operably connected to each of said supporting members to cause said members to move with respect to said guide means; and linkage means operatively connected to the baffles for translating the movement of said supporting members to the said baffles, said linkage means including a pair of axially aligned, spaced resilient bars rigidly attached at one end to the supporting member, a connecting link attached to the other end of each bar to pivotally connect said bars to the baffles, the bars being arranged to deflect towards each other and thereafter load the sealing means as the supporting member moves rearwardly on said guide means a predetermined distance whereby said connecting links adopt a skewed position to load said seal means and are toggled to lock said baffles in a nonoperative position.

4. The actuating mechanism as described in claim 3 wherein said other bar ends are joined by restraining straps adapted to act as stops when said mechanism is in the reverse thrust position, said straps being constructed and arranged to cooperate with each of said bars to operatively connect both of said baffles to the actuating means in the event of failure of one or the other of said bars.

5. A thrust reverser for a jet powerplant comprising: a plurality of movable baffles disposed to move from a stowed position forming a part of the powerplant structure to an operative position to laterally deflect the gas stream issuing from the engine exhaust duct, normally loaded sealing means between said baffles and adjacent powerplant structure to prevent gas leakage therebetween when said baffles are in the stowed position, support means positioned adjacent the duct to support and actuate said baffle, said support means including a guide means, a supporting member slidably engaged with said guide means, a linkage member connecting the supporting member and said baffle for translating the movement of said supporting member to said baffle, and actuator means connected to said support means to actuate said baffle, said support means including a resilient spring member to bias said support means when the baffle is in the stowed position to load said sealing means, and said supporting member and said linkage connected to assume an overcenter position when said baffle is in the stowed position to lock said baffle in that position.
strap adapted to act as a stop when said mechnism is in 6. Actuating mechanism for a jet powerplant thrust reverser having a plurality of circumferentially distributed baffle assemblies disposed to deflect the gas stream issuing from the powerplant exhaust duct and movable to a non-operative position out of said gas stream and forming a part of the powerplant structure with adjacent powerplant assemblies, sealing means engaging said assemblies to seal between said assemblies when they are positioned adjacent one another, axially aligned guide means supported adjacent the outer surface of said duct, said guide means being located between adjacent baffle assemblies, a supporting member slidably engaged with said guide means, power supplying means operably connected to said supporting member to cause said supporting member to move with respect to said guide means, and linkage means operatively connected between the supporting member and said adjacent baffle assemblies for translating the movement of said supporting member to the baffle assemblies, said linkage means including a resilient spring member to bias said support means when the baffle assemblies are in one of two positions to load said sealing means between adjacent assemblies, said supporting member and said linkage being connected to adopt a skewed position to load said resilient spring member and are toggled to lock said baffle assemblies in said one position.

References Cited in the file of this patent
UNITED STATES PATENTS

| | | |
|---|---|---|
| 2,274,776 | Cull | Mar. 3, 1942 |
| 2,365,927 | Allen | Dec. 26, 1944 |
| 2,746,243 | Pitt et al. | May 22, 1956 |
| 2,753,684 | Greene | July 10, 1956 |
| 2,780,058 | Beale et al. | Feb. 5, 1957 |